(12) United States Patent
Liang et al.

(10) Patent No.: US 11,513,501 B2
(45) Date of Patent: Nov. 29, 2022

(54) NUMERICAL CONTROLLER, CNC MACHINE TOOL, NUMERICAL CONTROL METHOD AND NON-TRANSITORY COMPUTER READABLE MEDIUM RECORDING A NUMERICAL CONTROL PROGRAM

(71) Applicant: FANUC CORPORATION, Yamanashi (JP)

(72) Inventors: Yao Liang, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 275 days.

(21) Appl. No.: 16/897,787

(22) Filed: Jun. 10, 2020

(65) Prior Publication Data
US 2020/0401115 A1    Dec. 24, 2020

(30) Foreign Application Priority Data
Jun. 21, 2019  (JP) .............................. JP2019-115322

(51) Int. Cl.
*G05B 19/416*   (2006.01)
*G05B 19/19*    (2006.01)

(52) U.S. Cl.
CPC ......... *G05B 19/4166* (2013.01); *G05B 19/19* (2013.01); *G05B 2219/43156* (2013.01)

(58) Field of Classification Search
None
See application file for complete search history.

(56) References Cited

U.S. PATENT DOCUMENTS 7,693,588 B2 * 4/2010 Hong .................. G05B 19/416
                                                 700/192

FOREIGN PATENT DOCUMENTS

| JP | 5-313729   | 11/1993 |
| JP | 2013-69123 | 4/2013  |

* cited by examiner

*Primary Examiner* — Carlos R Ortiz Rodriguez
(74) *Attorney, Agent, or Firm* — Wenderoth, Lind & Ponack, LLP

(57) ABSTRACT

An object is to read the information of a feature shape included in a machining program so as to calculate a control command suitable for machining processing on the feature shape. A numerical controller (300) includes: a feature detection unit (302) which detects the feature of a machined shape from a machining program that commands the movement of a tool or a workpiece; an inward-turning amount calculation unit (303) which calculates, based on a servo parameter of a servo controller (400) that drives the tool or the workpiece, the feature of the machined shape detected from the machining program and a machining requirement that specifies a machining condition, a relation formula that determines the inward-turning amount of a machining path with respect to a program path; and a feedrate determination unit (304) which determines a feedrate that is optimized with the relation formula.

8 Claims, 5 Drawing Sheets

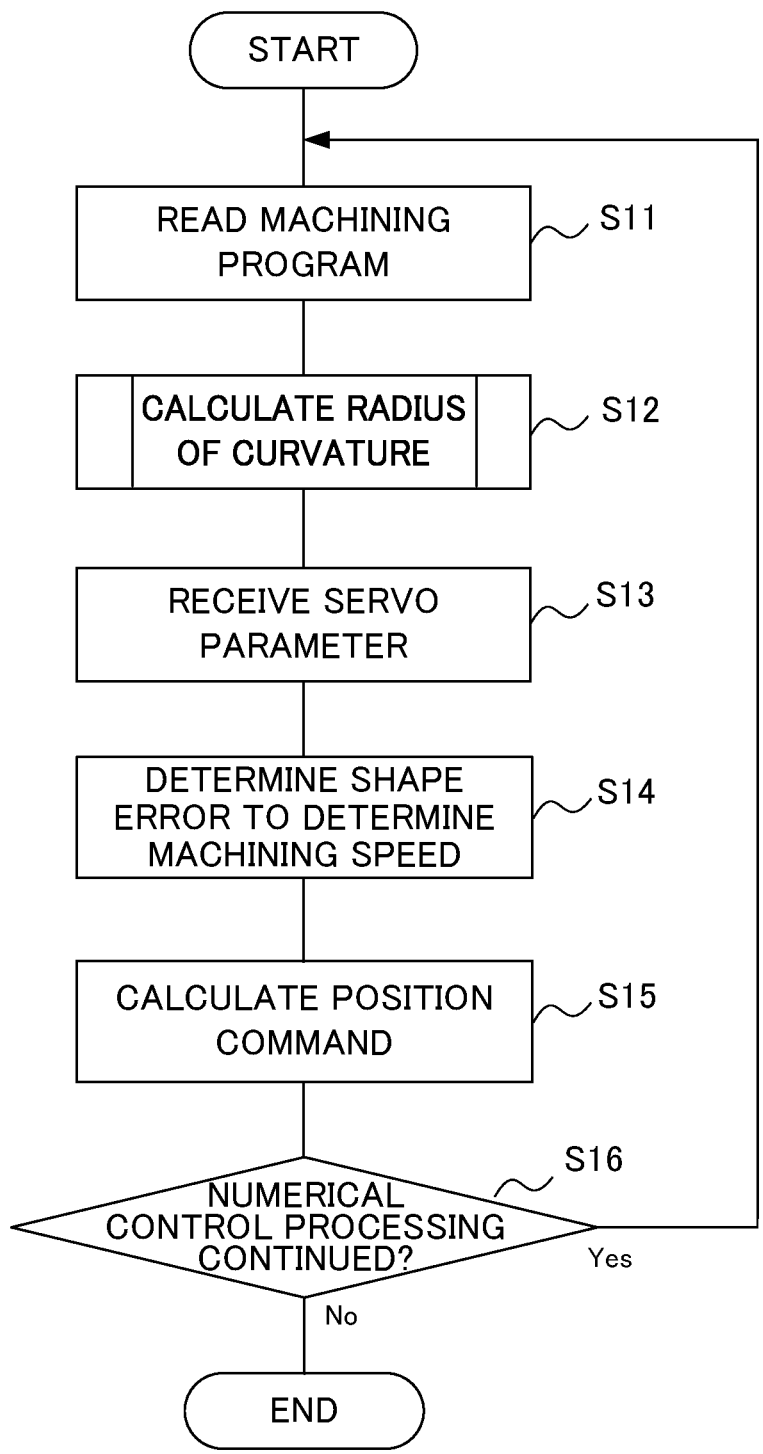

NUMERICAL CONTROLLER, CNC MACHINE TOOL, NUMERICAL CONTROL METHOD AND NON-TRANSITORY COMPUTER READABLE MEDIUM RECORDING A NUMERICAL CONTROL PROGRAM

This application is based on and claims the benefit of priority from Japanese Patent Application No. 2019-115322, filed on 21 Jun. 2019, the content of which is incorporated herein by reference.

BACKGROUND OF THE INVENTION

Field of the Invention

The present invention relates to a numerical controller, a CNC machine tool, a numerical control method and a non-transitory computer readable medium recording a numerical control program.

Related Art

A numerical controller is known which relatively moves a tool and a workpiece (piece to be machined) based on a machining program and which controls a machine tool so as to machine the workpiece.

For example, patent document 1 discloses that a numerical controller includes: a program reading means which previously reads an NC machining program in units of two blocks; a program analysis means which analyzes the NC machining program so as to convert it into data in an executable format; a shape determination means which calculates a corner angle α formed by the unit vector of a first block and the unit vector of a second block in two blocks, which determines, based on the corner angle α, whether or not a corner error caused by a delay in servo control exceeds an allowable range and in which when the corner error exceeds the allowable range, an instruction to perform an in-position check is provided to the data of the first block so as to make the corner error fall within the allowable range; and a servo control means which performs the servo control based on the data in the executable format and which performs the in-position check when the processing of the data of the first block is completed.

Patent document 2 discloses that a numerical controller analyzes a machining program formed with a plurality of blocks and performs acceleration/deceleration processing before interpolation and acceleration/deceleration processing after interpolation so as to perform velocity control. The numerical controller includes: an allowable inward-turning amount setting unit which sets the allowable value of an inward-turning amount calculated by an accumulation amount of acceleration/deceleration after interpolation when a corner portion produced between blocks is machined; a corner portion velocity calculation unit which calculates a corner portion velocity from the allowable inward-turning amount that is set, the acceleration of acceleration/deceleration before interpolation and the acceleration/deceleration time constant of acceleration/deceleration after interpolation that are previously set and a direction turning angle formed by the direction of the command route of a block before the corner and the direction of the command route of a block after the corner that are commanded in the machining program such that the inward-turning amount calculated by the accumulation amount of acceleration/deceleration after interpolation is equal to or less than the allowable inward-turning amount; a pre-interpolation acceleration/deceleration processing unit which performs the acceleration/deceleration processing before interpolation such that the combined feedrate of the corner portion is a feedrate calculated with the corner portion feedrate calculation unit and which thereby produces interpolation data; and a post-interpolation acceleration/deceleration processing unit which performs acceleration/deceleration processing on the interpolation data.

Patent Document 1: Japanese Unexamined Patent Application, Publication No. H05-313729
Patent Document 2: Japanese Unexamined Patent Application, Publication No. 2013-069123

SUMMARY OF THE INVENTION

When a numerical controller controls a machine tool, in the machined shape of a corner, an arc or the like, an error (called an inward-turning amount) may occur between a machining path which is machined with a tool and a program path which is set with a machining program. As the inward-turning amount is increased, the accuracy of machining is lowered. On the other hand, when a feedrate is lowered in order to reduce the inward-turning amount, a machining cycle time is increased so as to lower the efficiency. When the feedrate is set, it is required to satisfy machining requirements such as an allowable acceleration. It is desired to set an optimized feedrate which is equal to or less than an allowable inward-turning amount and which satisfies machining requirements such as an allowable acceleration so as to achieve both the accuracy of machining and the efficiency thereof.

(1) A first aspect of the present disclosure is a numerical controller including: a feature detection unit which detects the feature of a machined shape from a machining program that commands the movement of a tool or a workpiece; an inward-turning amount calculation unit which calculates, based on a servo parameter of a servo controller that drives the tool or the workpiece, the feature of the machined shape detected from the machining program and a machining requirement that specifies a machining condition, a relation formula that determines the inward-turning amount of a machining path with respect to a program path; and a feedrate determination unit which determines a feedrate that is optimized with the relation formula.

(2) A second aspect of the present disclosure is a CNC machine tool including: the numerical controller; and the servo controller which receives a control command from the numerical controller so as to drive the tool or the workpiece.

(3) A third aspect of the present disclosure is a numerical control method including: detecting the feature of a machined shape from a machining program that commands the movement of a tool or a workpiece; calculating, based on a servo parameter of a servo controller (400) that drives the tool or the workpiece, the feature of the machined shape detected from the machining program and a machining requirement that specifies a machining condition, a relation formula that determines the inward-turning amount of a machining path with respect to a program path; and determining a feedrate that is optimized with the relation formula.

(4) A fourth aspect of the present disclosure is a numerical control program which instructs a computer serving as a numerical controller to execute: processing which detects the feature of a machined shape from a machining program that commands the movement of a tool or a workpiece; processing which calculates, based on a servo parameter of a servo controller that drives the tool or the workpiece, the
} feature of the machined shape detected from the machining program and a machining requirement that specifies a machining condition, a relation formula that determines the inward-turning amount of a machining path with respect to a program path; and processing which determines a feedrate that is optimized with the relation formula.

In each of the aspects described above, it is possible to set an optimized feedrate which is equal to or less than an allowable inward-turning amount and which satisfies machining requirements such as an allowable acceleration so as to achieve both the accuracy of machining and the efficiency thereof.

BRIEF DESCRIPTION OF THE DRAWINGS

FIG. 5 is a flowchart showing the operation of the numerical controller.

DETAILED DESCRIPTION OF THE INVENTION

An embodiment of the present disclosure will be described in detail below with reference to drawings.

Figure 1:
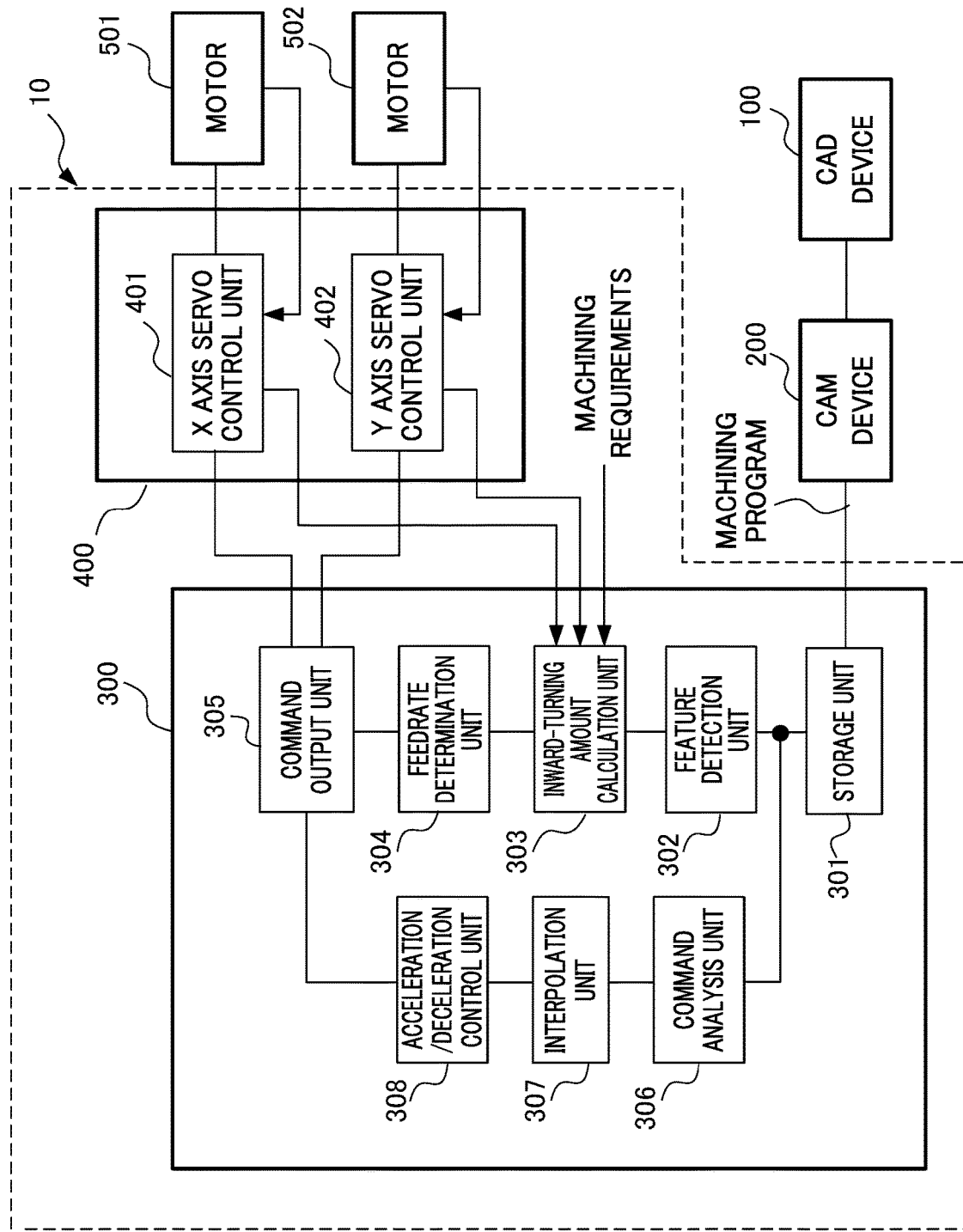
FIG. 1 is a block diagram showing the configuration of a CNC machine tool which includes a numerical controller according to an embodiment of the present disclosure.

FIG. 1 is a block diagram showing the configuration of a CNC machine tool which includes a numerical controller according to the embodiment of the present disclosure. As shown in FIG. 1, the CNC machine tool 10 includes the numerical controller 300 such as a CNC (Computerized Numerical Control) device and a servo controller 400. A CAD device 100 is connected to a CAM device 200, and the CAM device 200 is connected to the numerical controller 300. The servo controller 400 controls a motor 501 and a motor 502.

The CAD device 100 uses a CPU so as to execute CAD software for performing drawing on the screen of a computer. For a piece to be machined (workpiece), drawing is performed with a two-dimensional CAD or a three-dimensional CAD. When the two-dimensional CAD is used, on the plane of X and Y, a front view, a top view, a side view and the like of the machined piece are produced. When the three-dimensional CAD is used, on the three-dimensional space of X, Y and Z, a three-dimensional image of the machined piece is formed.

The CAM device 200 uses the CPU of a computer so as to execute CAM software for generating a machining program (NC data) based on the shape of the piece to be machined produced with the CAD device 100. The CAM software sets, based on CAD data, the movements of a tool and the machine tool so as to obtain a machined shape, converts the movements into CL (cutter location) data and generates the machining program (NC data) based on the CL data.

The CAD device 100 and the CAM device 200 may be integrally formed with one computer. The CAM device 200 or the CAD device 100 and the CAM device 200 may be provided within the numerical controller 300. Since the configurations of the CAD device 100 and the CAM device 200 are well known by a person skilled in the art, the detailed description thereof will be omitted.

The numerical controller 300 includes a storage unit 301 such as a memory, a feature detection unit 302, an inward-turning amount calculation unit 303, a feedrate determination unit 304, a command output unit 305, a command analysis unit 306, an interpolation unit 307 and an acceleration/deceleration control unit 308. The numerical controller 300 outputs, based on the machining program for commanding the movement of the tool or the workpiece, a control command such as a position command to the servo controller 400. The detailed description of the configuration and the operation of the numerical controller 300 will be described later.

The servo controller 400 includes an X axis servo control unit 401 and a Y axis servo control unit 402. The X axis servo control unit 401 and the Y axis servo control unit 402 respectively control the motors 501 and 502 of an X axis and a Y axis based on the control command such as the position command from the command output unit 305 of the numerical controller 300. Although the servo controller 400 includes a Z axis servo control unit and a spindle motor control unit in addition to the X axis servo control unit 401 and the Y axis servo control unit 402, they are omitted in FIG. 1. The detailed description of the configuration and the operation of the servo controller 400 will be described later.

The motors 501 and 502 are provided as part of the machine tool. However, the motors 501 and 502 may be provided as part of the servo controller 400. Although the motors 501 and 502 will be described below as motors which perform a rotary motion, they may be linear motors which perform a linear motion.

For example, the motors 501 and 502 are included in a machine tool such as a three-axis machine tool, and serve as feed axis motors of the X axis and the Y axis. When the CNC machine tool 10 is used as the three-axis machine tool, as a feed axis motor, a motor of the Z axis is additionally provided or although the three-axis machine tool includes a spindle motor which rotates the tool such as a ball endmill, it is omitted in FIG. 1.

When the motors 501 and 502 are motors that are used in the three-axis machine tool and that perform a rotary motion, the motors 501 and 502 linearly move, through ball screws or the like, a table on which the workpiece is placed in the direction of the X axis and in the direction of the Y axis, respectively. The motor of the Z axis linearly moves the tool or the table in the direction of the Z axis. The configuration of the three-axis machine tool is not limited to the configuration described above, and, for example, the tool may be fixed and the table may be linearly moved in the direction of the X axis, in the direction of the Y axis and in the direction of the Z axis or the table may be fixed and the tool may be linearly moved in the direction of the X axis, in the direction of the Y axis and in the direction of the Z axis. The machine tool is not limited to the three-axis machine tool, and may be, for example, a five-axis machine tool.

The CNC machine tool 10 described above may include the CAM device 200 or the CAD device 100 and the CAM device 200. The numerical controller 300 may include the servo controller 400.

Examples of the configurations of the servo controller 400 and the numerical controller 300 will then be described.

<Servo Controller>

Although the servo controller 400 includes the X axis servo control unit 401 and the Y axis servo control unit 402, the X axis servo control unit 401 will be described here. The Y axis servo control unit 402 has a similar configuration to the X axis servo control unit 401.

Figure 2:
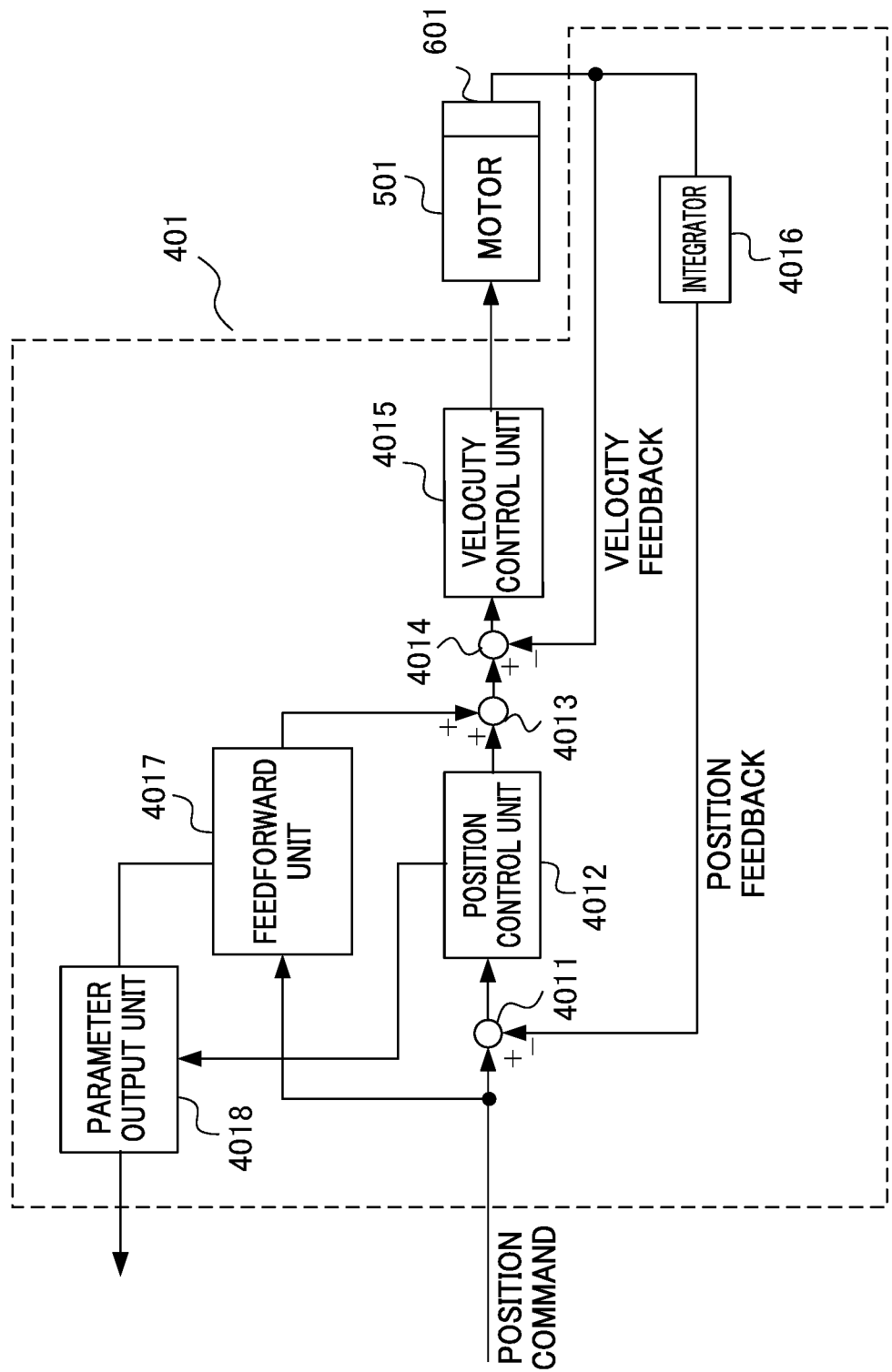
FIG. 2 is a block diagram showing an example of the configuration of an X axis servo controller.

FIG. 2 is a block diagram showing an example of the configuration of the X axis servo controller. As shown in FIG. 2, the X axis servo control unit 401 includes a subtractor 4011, a position control unit 4012, an adder 4013, a subtractor 4014, a velocity control unit 4015, an integrator 4016, a feedforward unit 4017 and a parameter output unit 4018.

The subtractor 4011 determines a difference between the position command output from the numerical controller 300 and a detection position subjected to position feedback, and outputs the difference as a position error to the position control unit 4012. The position control unit 4012 outputs, as a velocity command value, a value obtained by multiplying the position error by a position gain PG to the adder 4013.

The adder 4013 adds together the velocity command value and the output value (feedforward term) of the feedforward unit 4017, and outputs the resulting value to the subtractor 4014 as a velocity command subjected to feedforward control. The subtractor 4014 determines a difference between the velocity command output from the adder 4013 and a velocity detection value subjected to velocity feedback, and outputs the difference as a velocity error to the velocity control unit 4015.

The velocity control unit 4015 adds together a value obtained by multiplying the velocity error by an integral gain K1$v$ and then integrating the resulting value and a value obtained by multiplying the velocity error by a proportional gain K2$v$, and outputs the resulting value to the motor 501 as a torque command value. The integrator 4016 integrates the velocity detection value output from a rotary encoder 601 attached to the motor 501, and outputs a position detection value.

The rotation angle position of the motor 501 is detected with the rotary encoder 601, and the velocity detection value is input to the subtractor 4014 as velocity feedback information (velocity FB information). The velocity detection value is integrated in the integrator 4016 into the position detection value, and the position detection value is input to the subtractor 4011 as position feedback information (position FB information).

The feedforward unit 4017 outputs, as the feedforward term, to the adder 4013, a value obtained by differentiating the position command output from the numerical controller 300 and then multiplying the resulting value by a feedforward coefficient α.

The parameter output unit 4018 outputs, to the numerical controller 300, the position gain PG of the position control unit 4012 and the feedforward coefficient α of the feedforward unit 4017 as the servo parameters of the X axis servo control unit 401. When feedforward is disabled (feedforward is not performed), the parameter output unit 4018 outputs the feedforward coefficient α=0 (disabling of feedforward) as the servo parameter to the numerical controller 300.

<Numerical Controller>

The configuration of the numerical controller 300 will be described below with reference to FIG. 1. In the following discussion, as an example, a case where the machined shape is an arc will be described.

In the storage unit 301, the machining program produced in the CAM device 200 is stored. The feature detection unit 302 calculates, from the machining program read from the storage unit 301, machining information serving as the feature of the machined shape of the arc, for example, a radius of curvature R, and outputs it to the inward-turning amount calculation unit 303.

The inward-turning amount calculation unit 303 determines, based on the radius of curvature R output from the feature detection unit 302, the position gain PG output from the parameter output unit 4018 of the X axis servo control unit 401, the feedforward coefficient α, a feedrate V and machining requirements, a relation formula of the inward-turning amount of a machining path with respect to a program path. The machining requirements are stored by being input into a storage unit such as a memory in the inward-turning amount calculation unit 303. In the machining requirements, a method of acceleration/deceleration after interpolation is a linear type or a bell type or machining conditions such as a time constant after interpolation $T_1$, an arc allowable acceleration $a_{max}$ and a minute segment allowable acceleration a are included.

Figure 3:
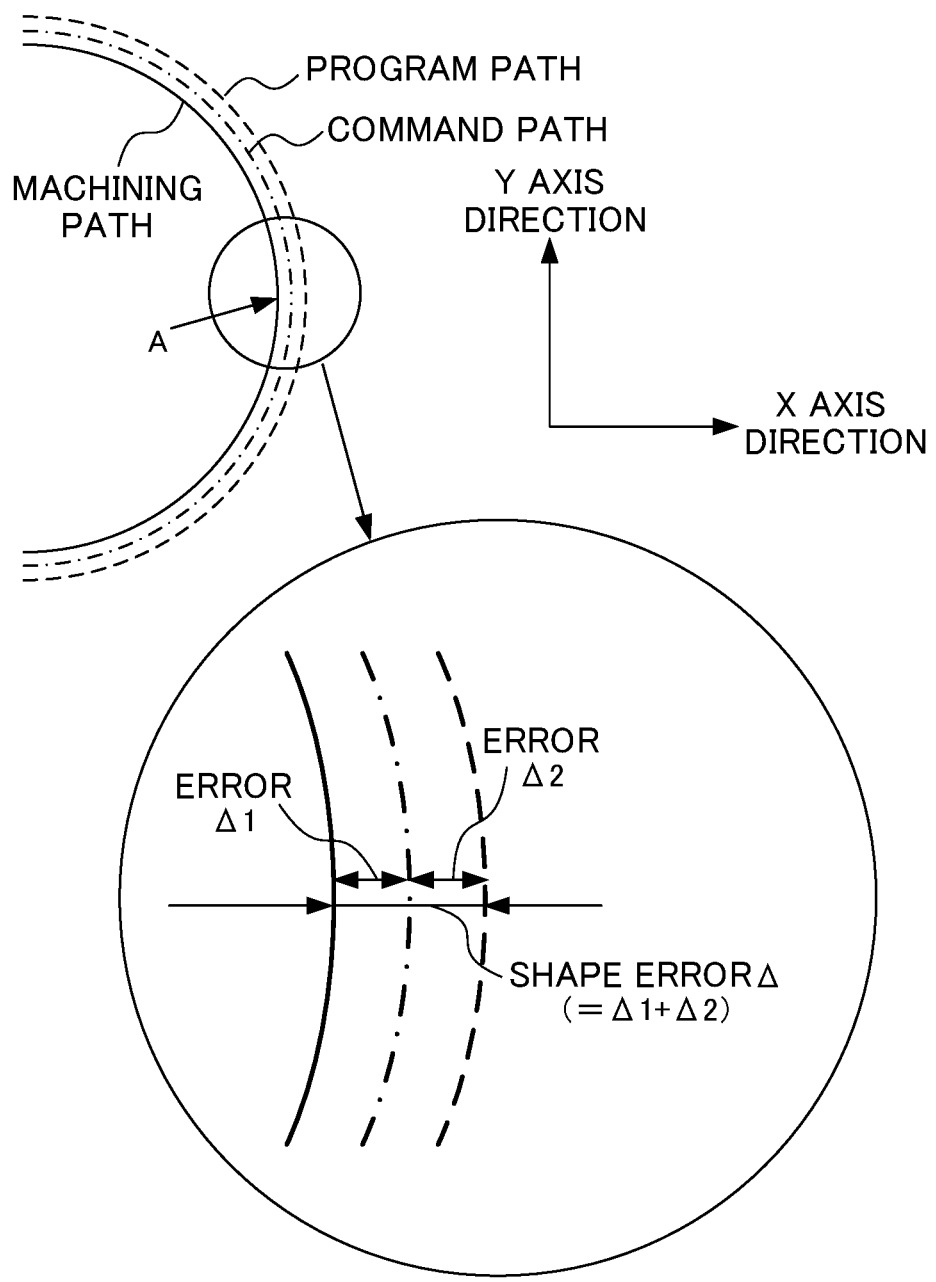
FIG. 3 is a diagram for illustrating an error caused by a delay in a servo system, an error caused by acceleration/deceleration after interpolation and a shape error.

The inward-turning amount of the machining path is a shape error $\Delta$ (=$\Delta 1+\Delta 2$) which is the sum of an error $\Delta 1$ caused by a delay in a servo system and an error $\Delta 2$ caused by acceleration/deceleration after interpolation. FIG. 3 is a diagram for illustrating the error $\Delta 1$ caused by the delay in the servo system, the error $\Delta 2$ caused by acceleration/deceleration after interpolation and the shape error $\Delta$. As shown in FIG. 3, the error $\Delta 2$ caused by acceleration/deceleration after interpolation indicates a difference between the program path based on the machining program and a command path based on the position command output from the numerical controller 300. The error $\Delta 1$ caused by the delay in the servo system indicates a difference between the command path and the machining path caused by the drive of the motor controlled with the servo controller 400. The shape error $\Delta$ indicates a difference between the program path based on the machining program and the machining path.

The error $\Delta 1$ caused by the delay in the servo system is represented by formula 1 (formula 1 below). In formula 1, V represents the feedrate, R represents the radius of curvature, $T_2$ represents the reciprocal of the position gain PG (=1/PG) and a represents the feedforward coefficient.

[Math. 1]

$$\Delta 1 = \frac{1}{2} \times \frac{V^2}{R} \times T_2^2 \times (1-\alpha^2)$$

When the method of acceleration/deceleration after interpolation is the linear type, the error $\Delta 2$ caused by acceleration/deceleration after interpolation is represented by formula 2 (formula 2 below) whereas when the method of acceleration/deceleration after interpolation is the bell type, the error $\Delta 2$ caused by acceleration/deceleration after interpolation is represented by formula 3 (formula 3 below). In formula 2, V represents the feedrate, R represents the radius of curvature and $T_1$ represents the time constant after interpolation. Formula 2 indicates that the error $\Delta 2$ is substantially equal to the right term of formula 2.

[Math. 2]

$$\Delta 2 \cong \frac{1}{24} \times \frac{V^2}{R} \times T_1^2$$

In formula 3, as in formula 2, V represents the feedrate, R represents the radius of curvature and $T_1$ represents the time constant after interpolation. Formula 3 indicates that the error $\Delta 2$ is substantially equal to the right term of formula 3.

[Math. 3]

$$\Delta 2 \cong \frac{1}{48} \times \frac{V^2}{R} \times T_1^2$$

The inward-turning amount calculation unit 303 determines the relation formula of the inward-turning amount of the machining path which is the shape error $\Delta$ (=$\Delta 1+\Delta 2$), and outputs it to the feedrate determination unit 304.

The feedrate determination unit 304 divides the shape error $\Delta$ (=$\Delta 1+\Delta 2$) by an allowable shape error S so as to determine a shape error coefficient $\lambda$ (=$\Delta/S$). Then, the feedrate determination unit 304 determines the maximum value Vmax of the feedrate in which the shape error coefficient $\lambda$, the absolute value of the time derivative of the feedrate and the absolute value of the feedrate respectively satisfy a condition 1, a condition 2 and a condition 3 represented by formula 4 (formula 4 below), and outputs the maximum value Vmax to the command output unit 305. The maximum value Vmax of the feedrate is the feedrate which is optimized. The condition 1 is a condition based on the requirement of the accuracy of machining, the condition 2 is a condition based on the requirement of an allowable acceleration and the condition 3 is a condition based on the requirement of the velocity caused by the minute segment. In formula 4, $a_{max}$ represents the arc allowable acceleration (allowable acceleration caused by acceleration/deceleration of arc interpolation), a represents the minute segment allowable acceleration and R represents the radius of curvature.

[Math. 4]

$$0 \leq \lambda \leq 1 \quad \text{CONDITION 1}$$

$$\left|\frac{\partial V}{\partial t}\right| \leq a_{max} \quad \text{CONDITION 2}$$

$$|V| \leq \sqrt{a \times R} \quad \text{CONDITION 3}$$

The condition 3 is enabled when the length L of the minute segment between program command points set in the CAM device 200 which is represented by formula 5 (formula 5 below) is less than a parameter for a block length. The right term of the condition 3 is the maximum value of a feedrate.

$$L = \sqrt{8RH - 4H^2} \quad \text{[Math. 5]}$$

Figure 4:
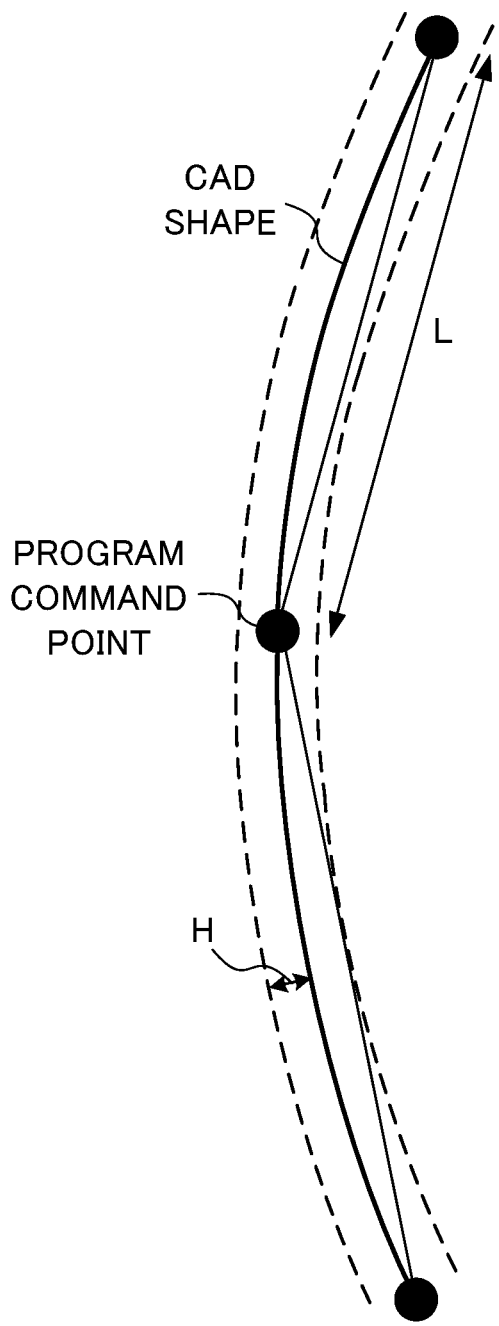
FIG. 4 is an illustrative diagram showing program command points set in a CAM device, the length L of a minute segment between the program command points and a tolerance H.

In formula 5, R represents the radius of curvature, and H represents a tolerance. The length L in formula 5 is the feature of the machined shape. FIG. 4 is an illustrative diagram showing the program command points set in the CAM device 200, the length L of the minute segment between the program command points and the tolerance H.

The condition 1 of formula 4 is determined for each of the feedrate component of the feedrate V in the direction of the X axis and the feedrate component of the feedrate V in the direction of the Y axis. When the condition 1 is determined for the feedrate component of the feedrate V in the direction of the X axis, as the shape error coefficient $\lambda$, a shape error coefficient in the direction of the X axis which is calculated based on the servo parameter output from the X axis servo control unit 401 is used. When the condition 1 is determined for the feedrate component of the feedrate V in the direction of the Y axis, as the shape error coefficient $\lambda$, a shape error coefficient in the direction of the Y axis which is calculated based on the servo parameter output from the Y axis servo control unit 402 is used.

Since as shown in formulas 1 to 3, the error $\Delta 1$ and the error $\Delta 2$ are proportional to the square of the feedrate V, the shape error $\Delta$ (=$\Delta 1+\Delta 2$) is also proportional to the square of the feedrate V. When it is assumed that the radius of curvature R, the coefficient $T_1$, the coefficient $T_2$ and the feedforward coefficient $\alpha$ are constant, the condition 1 is used to determine, in the position in which the feedrate is the maximum, the maximum value Vmax of the feedrate where the shape error $\Delta$ is equal to or less than the allowable shape error S. For example, although in FIG. 3, the feedrate at a point A in the direction of the Y axis is the maximum, the maximum value Vmax of the feedrate in the direction of the Y axis is determined such that the shape error $\Delta$ at the point A is equal to or less than the allowable shape error S.

The conditions 2 and 3 of formula 4 are determined for the feedrate V in which the component in the direction of the X axis and the component in the direction of the Y axis are combined together.

Although the operations of the inward-turning amount calculation unit 303 and the feedrate determination unit 304 as described above are operations on the determination of the feedrate in the X axis for the X axis servo control unit 401, the inward-turning amount calculation unit 303 and the feedrate determination unit 304 likewise perform the determination of the feedrate in the Y axis for the Y axis servo control unit 402.

The command analysis unit 306 sequentially reads, from the machining program, blocks including commands for movements in the X axis and the Y axis and analyzes them so as to produce, based on the result of the analysis, movement command data which commands the movements in the individual axes. The interpolation unit 307 calculates, based on a movement command which is commanded from the movement command data output from the command analysis unit 306, interpolation data obtained by calculating, with interpolation, points on a command route at an interpolation period.

The acceleration/deceleration control unit 308 performs, based on the interpolation data output from the interpolation unit 307, acceleration/deceleration processing so as to calculate the feedrate in each of the axes at the interpolation period, and outputs it to the command output unit 305 which will be described later. The command output unit 305 calculates the position command based on the feedrate in each of the axes output from the acceleration/deceleration control unit 308 and the maximum value Vmax of the feedrate output from the feedrate determination unit 304, and outputs the position command to the servo controller 400. The command output unit 305 calculates the position command such that in the arc, the feedrate in each of the axes is the feedrate of the maximum value Vmax. The feedrate in each of the axes may be set lower than the feedrate of the maximum value Vmax with consideration given to a variation in the feedrate.

In the numerical controller of the present embodiment described above, under the condition 1 indicated in formula 4, the shape error $\Delta$ for determining the shape error coefficient $\lambda$ is determined with consideration given to not only the error caused by acceleration/deceleration after interpolation but also the error caused by the delay in the servo system. Then, when the maximum value of the feedrate is determined, it is determined with consideration given to the arc allowable acceleration under the condition 2 and the feedrate caused by the minute segment under the condition 3. In this way, it is possible to set the optimized feedrate which is equal to or less than an allowable inward-turning amount and which satisfies machining requirements such as the allowable acceleration. Consequently, it is possible to perform the machining which enhances both the accuracy of machining and the efficiency resulting from the lowering of a machining cycle time.

The functional blocks included in the numerical controller 300 and the servo controller 400 have been described above. In order to realize these functional blocks, the numerical controller 300 and the servo controller 400 each include a computation processing device such as a CPU (Central Processing Unit). The numerical controller 300 and the servo controller 400 also include an auxiliary storage device such as a HDD (Hard Disk Drive) which stores various types of control programs such as application software and an OS (Operating System) and a main storage device such as a RAM (Random Access Memory) which stores data that is temporarily necessary for the computation processing device to execute a program.

In each of the numerical controller 300 and the servo controller 400, the computation processing device reads the application software and the OS from the auxiliary storage device, and performs, while deploying the application software and the OS which are read to the main storage device, computation processing based on the application software and the OS. Based on the result of the computation, various types of hardware included in the individual devices are controlled. In this way, the functional blocks of the present embodiment are realized. In other words, the present embodiment can be realized by the cooperation of hardware and software.

The numerical controller 300 may include the servo controller 400, and in this case, the computation processing device such as a CPU (Central Processing Unit), the auxiliary storage device and the main storage device are shared, with the result that they do not need to be provided in each of the numerical controller 300 and the servo controller 400.

Preferably, when a large amount of computation is performed in the numerical controller 300 or the servo controller 400, for example, a GPU (Graphics Processing Units) is incorporated in a personal computer, by a technology called a GPGPU (General-Purpose computing on Graphics Processing Units), the GPU is utilized in computation processing involving machine learning and thus high-speed processing can be performed. Furthermore, in order to perform higher-speed processing, a plurality of computers incorporating the GPUs as described above may be used so as to establish a computer cluster, and parallel processing may be performed with the computers included in the computer cluster.

The operation of the numerical controller 300 in the present embodiment will then be described with reference to the flowchart of FIG. 5. FIG. 5 is the flowchart showing the operation of the numerical controller 300 in the present embodiment.

In step S11 of FIG. 5, the feature detection unit 302 first reads the machining program from the storage unit 301. Then, in step S12, the feature detection unit 302 calculates the radius of curvature R and outputs it to the inward-turning amount calculation unit 303.

In step S13, the inward-turning amount calculation unit 303 determines the relation formula of the inward-turning amount of the machining path based on the radius of curvature R output from the feature detection unit 302, the servo parameters (the position gain PG and the feedforward coefficient α) output from the parameter output unit 4018 of the X axis servo control unit 401, the feedrate V and the machining requirements.

In step S14, the feedrate determination unit 304 uses the relation formula of the inward-turning amount of the machining path with respect to the program path so as to determine the maximum value Vmax of the feedrate which satisfies the conditions 1, 2 and 3 indicated in formula 4.

In step S15, the command output unit 305 uses the feedrate in each of the axes output from the acceleration/deceleration control unit 308 and the maximum value Vmax of the feedrate output from the feedrate determination unit 304 so as to calculate the position command, and outputs it to the servo controller 400.

In step S16, whether or not numerical control processing is continued is determined, and when the numerical control processing is continued (yes in step S16), the numerical control processing returns to step S11. On the other hand, when the numerical control processing is not continued (no in step S16), the numerical control processing is completed.

The individual constituent units included in the numerical controller described above can be realized with hardware, software or a combination thereof. The servo control method which is performed by the cooperation of the individual constituent units included in the motor control device described above can be realized with hardware, software or a combination thereof. Here, the realization by software means that a computer reads and executes programs so as to achieve the realization.

The programs are stored with various types of non-transitory computer readable media, and can be supplied to the computer. Examples of the non-transitory computer readable medium include various types of tangible storage media. Examples of the non-transitory computer readable medium include a magnetic recording medium (for example, a hard disk drive), a magneto-optical recording medium (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM (random access memory)).

Although the embodiment described above is a preferred embodiment of the present invention, the scope of the present invention is not limited to the embodiment described above, and various modifications can be practiced without departing from the spirit of the present invention.

For example, although in the embodiment described above, the numerical controller is used for a machine tool, there is no limitation to the application of a machine tool, and the numerical controller may be provided for a machine such as a robot, an industrial machine or the like. The numerical controller and the servo controller may be provided as part of a machine tool, a robot, an industrial machine or the like. Although in the embodiment described above, the machined shape is an arc, and the feature of the machined shape is the radius of curvature, there is no limitation to this case, and for example, the present invention can also be applied to a case where the machined shape is a corner and the feature of the machined shape is the angle of the corner. The servo parameters may include any one of disabling of feedforward, a feedforward coefficient and feedforward timing. When acceleration/deceleration before cutting feed interpolation is performed before the interpolation unit 307, the machining conditions (machining requirement parameters) of the machining requirements may include an allowable maximum acceleration of acceleration/deceleration before cutting feed interpolation. When the machined shape is a corner, the machining conditions of the machining requirements may include an allowable velocity difference of a corner portion. The machining conditions of the machining requirements may include one or a plurality of a lower limit velocity caused by acceleration/deceleration of arc interpolation, an allowable acceleration variation amount in velocity control caused by a variation in acceleration and a tolerance requirement of smoothing.

The numerical controller, the CNC machine tool, the numerical control method and the numerical control program according to the present disclosure can take, in addition to the embodiment described above, various types of embodiments having configurations below.

(1) An aspect of the present disclosure is a numerical controller (for example, the numerical controller 300) including: a feature detection unit (for example, the feature detection unit 302) which detects the feature of a machined shape from a machining program that commands the movement of a tool or a workpiece; an inward-turning amount calculation unit (for example, the inward-turning amount calculation unit 303) which calculates, based on a servo parameter of a servo controller (for example, the servo controller 400) that drives the tool or the workpiece, the feature of the machined shape detected from the machining program and a machining requirement that specifies a machining condition, a relation formula that determines the inward-turning amount of a machining path with respect to a program path; and a feedrate determination unit (for example, the feedrate determination unit 304) which determines a feedrate that is optimized with the relation formula. In the numerical controller described above, it is possible to set an optimized feedrate which is equal to or less than an allowable inward-turning amount and which satisfies machining requirements such as an allowable acceleration so as to achieve both the accuracy of machining and the efficiency thereof.

(2) In the numerical controller according to (1) described above, the feature of the machined shape includes at least one of a curvature and the length of a minute segment. In the numerical controller described above, when the machined shape is an arc, it is possible to perform the machining which enhances both the accuracy of machining and the efficiency.

(3) In the numerical controller according to claim 1 or 2, the servo parameter includes disabling of feedforward or a feedforward coefficient. In the numerical controller described above, when the servo controller performs feedforward processing, it is possible to perform the machining which enhances both the accuracy of machining and the efficiency.

(4) In the numerical controller according to any one of (1) to (3) described above, the machining condition includes at least one of a method of acceleration/deceleration after interpolation, an acceleration/deceleration time constant after interpolation, an allowable acceleration caused by acceleration/deceleration of arc interpolation and a minute segment allowable acceleration. In the numerical controller described above, when the machined shape is an arc, it is possible to perform the machining which enhances both the accuracy of machining and the efficiency.

(5) The numerical controller according to any one of (1) to (4) described above, includes the servo controller. In the numerical controller described above, it is possible to reduce the size of a system which includes the numerical controller and the servo controller.

(6) Another aspect of the present disclosure is a CNC machine tool (for example, the CNC machine tool 10) including: the numerical controller according to any one of (1) to (4) described above; and the servo controller which receives a control command from the numerical controller so as to drive the tool or the workpiece. In the CNC machine tool described above, it is possible to set an optimized feedrate which is equal to or less than an allowable inward-turning amount and which satisfies machining requirements such as an allowable acceleration so as to achieve both the accuracy of machining and the efficiency thereof.

(7) Another aspect of the present disclosure is a numerical control method of a numerical controller, and the numerical control method includes: detecting the feature of a machined shape from a machining program that commands the movement of a tool or a workpiece; calculating, based on a servo parameter of a servo controller that drives the tool or the workpiece, the feature of the machined shape detected from the machining program and a machining requirement that specifies a machining condition, a relation formula that determines the inward-turning amount of a machining path with respect to a program path; and determining a feedrate that is optimized with the relation formula. In the numerical control method described above, it is possible to set an optimized feedrate which is equal to or less than an allowable inward-turning amount and which satisfies machining requirements such as an allowable acceleration so as to achieve both the accuracy of machining and the efficiency thereof.

(8) Another aspect of the present disclosure is a numerical control program which instructs a computer serving as a numerical controller to execute: processing which detects the feature of a machined shape from a machining program that commands the movement of a tool or a workpiece; processing which calculates, based on a servo parameter of a servo controller that drives the tool or the workpiece, the feature of the machined shape detected from the machining program and a machining requirement that specifies a machining condition, a relation formula that determines the inward-turning amount of a machining path with respect to a program path; and processing which determines a feedrate that is optimized with the relation formula. In the numerical control program described above, it is possible to set an optimized feedrate which is equal to or less than an allowable inward-turning amount and which satisfies machining requirements such as an allowable acceleration so as to achieve both the accuracy of machining and the efficiency thereof.

EXPLANATION OF REFERENCE NUMERALS

10 CNC machine tool
100 CAD device
200 CAM device
300 numerical controller
301 storage unit
302 feature detection unit
303 inward-turning amount calculation unit
304 feedrate determination unit
305 command output unit
306 command analysis unit
307 interpolation unit
308 acceleration/deceleration control unit
400 servo controller
501, 502 motor

What is claimed is:

1. A numerical controller comprising:
a feature detection unit which detects a feature of a machined shape from a machining program that commands a movement of a tool or a workpiece;
an inward-turning amount calculation unit which calculates, based on a servo parameter of a servo controller that drives the tool or the workpiece, the feature of the machined shape detected from the machining program and a machining requirement that specifies a machining condition, a relation formula that determines an inward-turning amount of a machining path with respect to a program path; and
a feedrate determination unit which determines a feedrate that is optimized with the relation formula,
wherein the inward-turning amount of the machining path is a shape error indicating a difference between the machining path and the program path, the shape error being a sum of a first error caused by a delay in a servo system and a second error caused by acceleration/deceleration after interpolation, and
wherein the relation formula that determines the inward-turning amount of the machining path is composed of a first relation formula that determines the first error caused by a delay in a servo system and a second relation formula that determines the second error caused by acceleration/deceleration after interpolation.

2. The numerical controller according to claim 1, wherein the feature of the machined shape includes at least one of a curvature and a length of a minute segment.

3. The numerical controller according to claim 1, wherein the servo parameter includes disabling of feedforward or a feedforward coefficient.

4. The numerical controller according to claim 1, wherein the machining condition includes at least one of a method of acceleration/deceleration after interpolation, an acceleration/deceleration time constant after interpolation, an allowable acceleration caused by acceleration/deceleration of arc interpolation and a minute segment allowable acceleration.

5. The numerical controller according to claim 1, comprising the servo controller.

6. A CNC machine tool comprising: the numerical controller according to claim 1; and the servo controller which receives a control command from the numerical controller so as to drive the tool or the workpiece.

7. A numerical control method of a numerical controller, the numerical control method comprising:
detecting a feature of a machined shape from a machining program that commands a movement of a tool or a workpiece;
calculating, based on a servo parameter of a servo controller that drives the tool or the workpiece, the feature of the machined shape detected from the machining program and a machining requirement that specifies a machining condition, a relation formula that determines an inward-turning amount of a machining path with respect to a program path; and
determining a feedrate that is optimized with the relation formula,
wherein the inward-turning amount of the machining path is a shape error indicating a difference between the machining path and the program path, the shape error being a sum of a first error caused by a delay in a servo system and a second error caused by acceleration/deceleration after interpolation, and
wherein the relation formula that determines the inward-turning amount of the machining path is composed of a first relation formula that determines the first error caused by a delay in a servo system and a second relation formula that determines the second error caused by acceleration/deceleration after interpolation.

8. A non-transitory computer readable recording medium recording a numerical control program which instructs a computer serving as a numerical controller to execute:
processing which detects a feature of a machined shape from a machining program that commands a movement of a tool or a workpiece;
processing which calculates, based on a servo parameter of a servo controller that drives the tool or the workpiece, the feature of the machined shape detected from the machining program and a machining requirement that specifies a machining condition, a relation formula that determines an inward-turning amount of a machining path with respect to a program path; and
processing which determines a feedrate that is optimized with the relation formula,
wherein the inward-turning amount of the machining path is a shape error indicating a difference between the machining path and the program path, the shape error being a sum of a first error caused by a delay in a servo system and a second error caused by acceleration/deceleration after interpolation, and
wherein the relation formula that determines the inward-turning amount of the machining path is composed of a first relation formula that determines the first error caused by a delay in a servo system and a second relation formula that determines the second error caused by acceleration/deceleration after interpolation.

* * * * *